June 9, 1925. 1,541,432
R. S. MATTINGLEY
BED
Filed Nov. 19, 1923 2 Sheets-Sheet 1
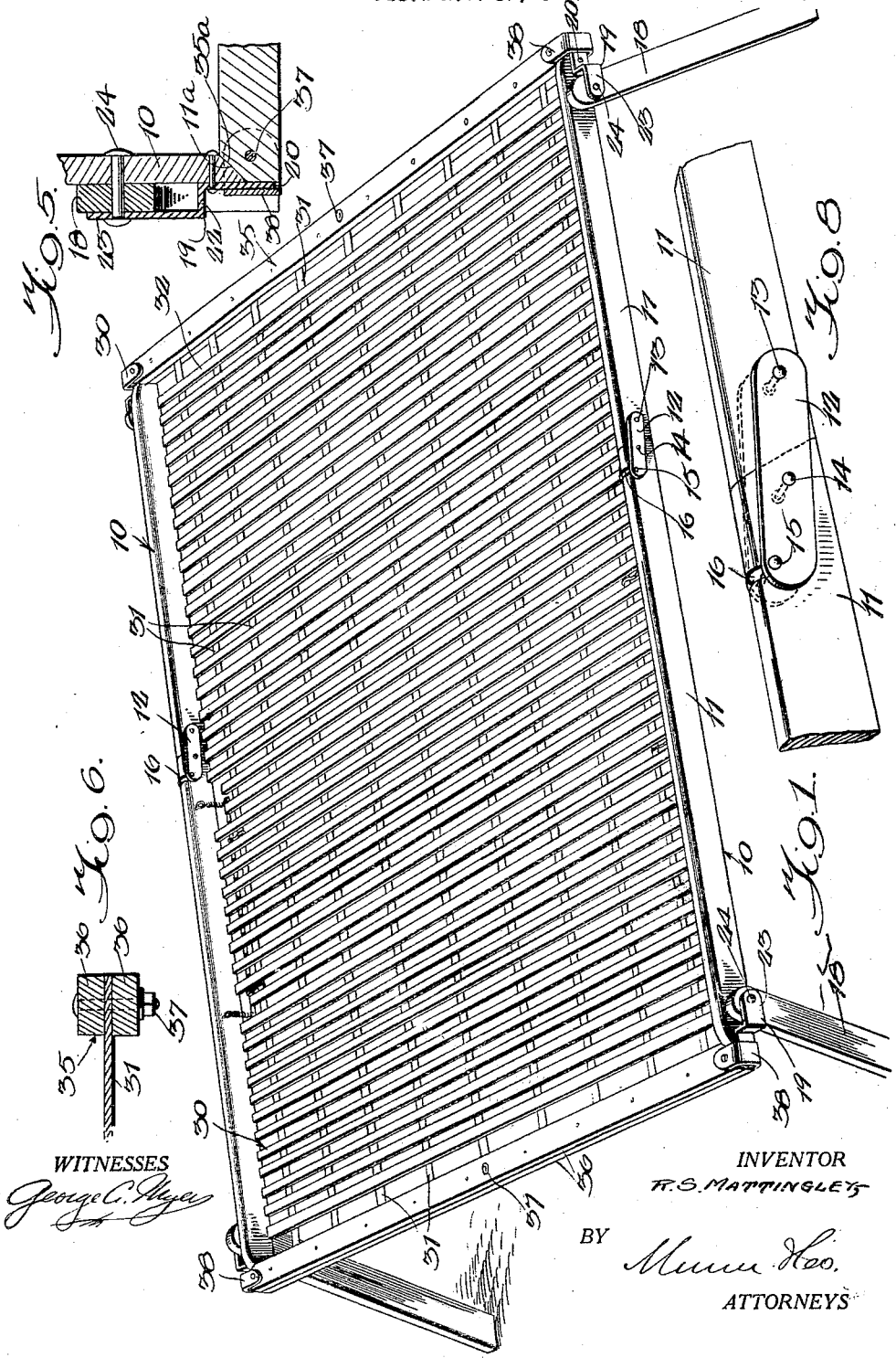
WITNESSES
INVENTOR
R. S. MATTINGLEY
BY
ATTORNEYS

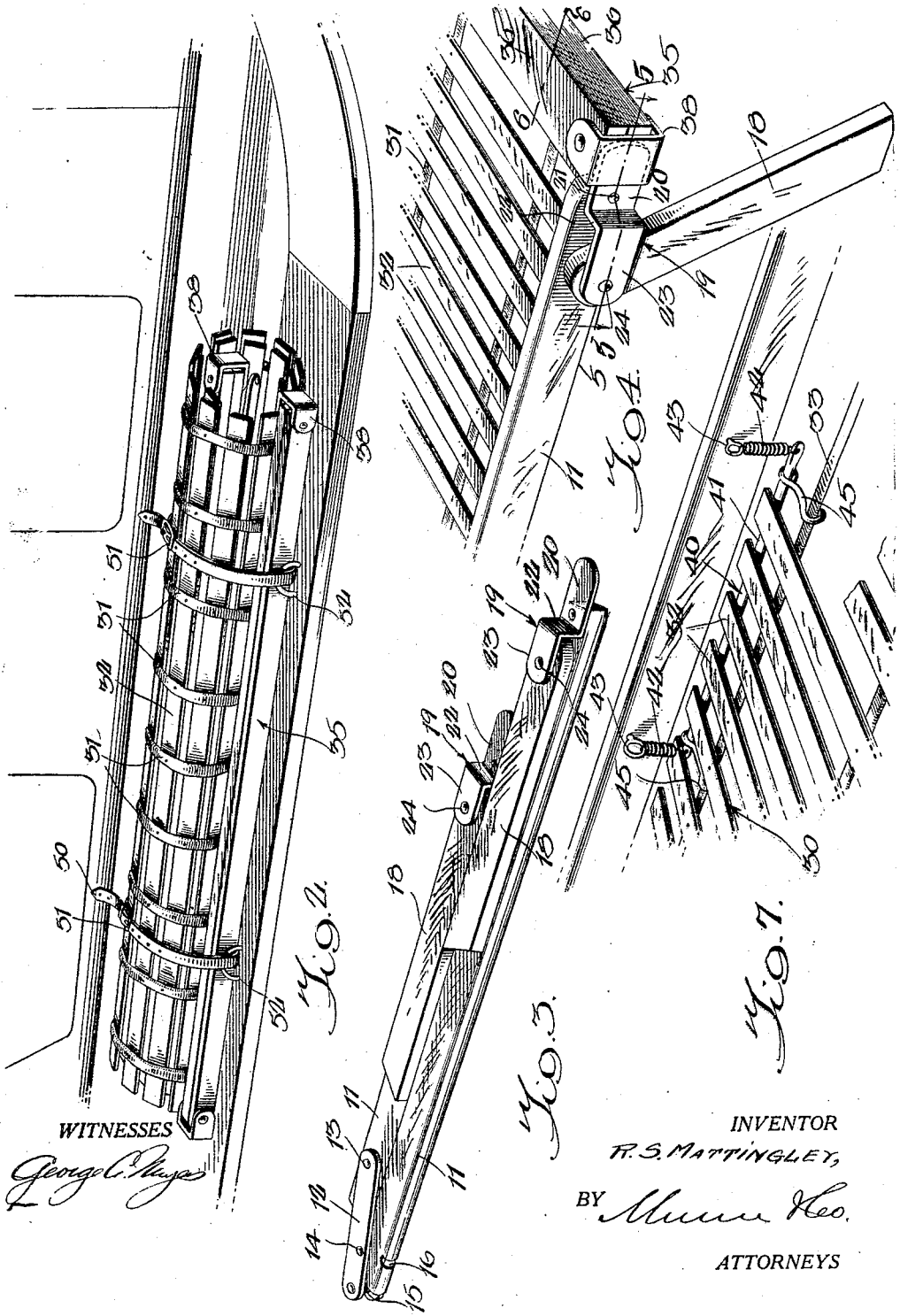

Patented June 9, 1925.

1,541,432

UNITED STATES PATENT OFFICE.

RAY SQUIER MATTINGLEY, OF ROCKPORT, INDIANA.

BED.

Application filed November 19, 1923. Serial No. 675,729.

*To all whom it may concern:*

Be it known that I, RAY S. MATTINGLEY, a citizen of the United States, and a resident of Rockport, in the county of Spencer and State of Indiana, have invented certain new and useful Improvements in Beds, of which the following is a specification.

This invention relates in general to an improvement in beds, and more particularly to an improvement in camping beds, especially, although not necessarily, designed and adapted for use by automobile tourists.

The object of the invention is to provide a campbed of this character which is strong and durable, and well adapted to withstand rough usage, while providing comfortable sleeping accommodations.

A further object is to provide a camping bed having the foregoing advantages and capacities and which is so constructed and organized as to be collapsible, foldable and rollable, whereby the bed may be compactly bundled and conveniently carried on the running board of an automobile or on any other suitable place.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a perspective view showing a bed embodying the present invention extended and ready for use;

Figure 2 is a similar view, showing the bed collapsed, folded and rolled and secured on the running board of an automobile;

Figure 3 is a perspective view, showing the side rail and its legs collapsed and folded;

Figure 4 is a fragmentary view in perspective, showing one corner of the bed;

Figure 5 is a fragmentary view in section, taken approximately on line 5—5 of Figure 4 and looking in the direction of the arrows;

Figure 6 is a similar view in vertical section, on line 6—6 of Figure 4;

Figure 7 is a fragmentary detail perspective view of the auxiliary supporting device for the spring; and Figure 8 is a fragmentary perspective view, showing the connection of the sections of the side rail.

Referring to the drawings, it will be seen that the frame of the bed includes side rails, designated generally at 10. Each side rail 10 comprises a pair of sections 11 which are connected to each other so as to be adapted to be extended to provide a rigid rail structure or to be compactly folded. For this purpose a pair of links 12 is provided for each side rail of the bed. As shown to advantage in Figure 8, each link 12 is pivotally connected at one end to one section of the side rail, as indicated at 13. Intermediate its ends each link 12 is pivotally connected, as at 14, to the other section of the side rail. A pin 15 is secured to and extends transversely between the links 12 and in the extended position of the side rails this pin 15 is received in an inclined slot 16 provided in the section of the side rail in which the pivot 14 occurs. The abutting faces of the sections 11 of each side rail are beveled on a plane which extends transversely with respect to the longitudinal axes of the side rail and which is inclined with respect to the vertical.

Legs 18 are pivotally connected to each side rail by brackets, designated generally at 19. As shown to advantage in Figures 4 and 5 each bracket 19 includes an arm 20 secured, as at 21, to the side rail and having integrally formed therewith a combined connecting portion and stop 22 which extends at right angles to the arm 20, an arm 23 being integrally formed with the outer end of the portion 22 and extending in spaced parallel relation with respect to the side rail. Each leg 18 is received between an arm 23 of the bracket 19 and the adjacent portion of the side rail of the bed, and is pivotally connected to these parts by a pivot pin 24. The portions 22 serve to connect the arms 23 to the arms 21 and are also engageable with the legs 18 to limit the pivotal movement thereof in a counter-clockwise direction, as viewed in Figure 4 whereby these portions 22 also constitute stops.

A spring, designated generally at 30, is provided and comprises a plurality of longitudinal strips or webbing, designated at 31, and constituted of fabric or other suitable material. Preferably the strips of webbing 31 are slightly elastic and in order that they may have this property the fabric of which they are composed may have woven or otherwise embodied therein rubber or other elastic material. A plurality of transverse slats or strips 32 extend across and over the webbing 31 and preferably each slat 32 is secured at each point of intersection to each piece of webbing 31, a staple or other suitable fastening device being employed for this purpose. The slats 32 may be constituted of wood or other material having some degree of resiliency or elasticity.

End rails designated generally at 35 are provided. Preferably each end rail is made up of two bars 36 which receive between them the ends of the webbing 31. The bars 36 are urged into clamping engagement with the ends of the webbing 31 by means of bolts and nuts, designated at 37. Two of the bolts and nuts 37 employed for the purpose stated also serve to connect channel shaped clips 38 to the extremities of the end rails 35. It is to be understood at this point that additional means may be provided for securing the ends of the webbing to the end rails if desired.

In assembly, the end rails 35 extend transversely between the side rails 10 at the ends of the side rails and the extremities of the side and end rails are beveled as at 11ª and 35ª so that these parts snugly interfit.

In setting up the bed the side rails are partially extended and the clips 38 of one end rail 35 are slipped over the arms 20 of the brackets 19 at one end of the bed. The side rails are then partially collapsed or folded in order to shorten the distance between the ends of the side rails whereby the other clips 38 of the other end rail may be conveniently engaged with the arms 20 of the brackets 19 at the other end of the bed. With the parts so engaged the sections 11 of the side rails may be pressed down at the center to extend the side rails and simultaneously stretch the spring. When the bed is set up, the webbing 31 of the spring is under tension and tends to hold the end rail assembled with the side rails. The beveled juncture of the end rails and side rails together with the action of the arms 20 and clips 38 tend to produce a strong, rigid and durable bed frame. By virtue of the bevel or inclination of the abutting faces of the sections 11 of the side rails 10, the tension of the spring is also effective to resiliently hold the sections 11 of each side rail against folding or collapsing, the bevel being made sufficient for this purpose. If found desirable the pins 15 may also be made to frictionally engage the walls of the slots 16 to aid in releasably holding the sections 11 of the side rails in extended position.

Since the slats 32 of the spring are secured to each piece of webbing 31 the spring does not tend to sag along its longitudinal center although all parts of the spring are sufficiently yieldable and resilient for comfort.

An auxiliary supporting device, designated generally at 40 is provided on each side rail of the bed frame and is designed to prevent the spring from sagging transversely. Each auxiliary supporting device comprises a rod 41 yieldably supported on the side rails of the bed frame by retractile coil springs 42, each retractile coil spring having one end connected to the rod and having its other end connected to a screw eye 43 provided on the side rails. Hooks 45 are adjustably mounted on the rod 40 and are engageable with the adjacent pieces of webbing 33.

In taking down the bed the side rails 11 of the frame are folded or broken at the center by pressing upwardly or delivering a blow on the under side of each side rail and below the abutting faces of the sections 11 or below the pivot 13. This will cause the sections 11 of each side rail to swing into angular relation with respect to each other, the pin 15 moving out of the slot 16 at the same time. When the side rails are thus partially folded or broken, the end rails may be readily detached from the side rails. Each side rail is then folded as shown in Figure 3 and the legs 18 carried by each side rail folded up against the same as also shown to advantage in Figure 3. The side rails and the legs thus folded, may be laid along one of the end rails and the spring rolled to enclose these parts and compactly bundle the bed. Preferably one of the end rails carries two straps 50 having buckles 51 whereby the parts may be held collapsed and folded. The straps encircle the rolled spring and end rails with the folded side rails therein and may also pass through eyes 52 carried on the running board of an automobile, as shown in Figure 2.

It is to be noted that when the bed is set up, the side rails can only be collapsed or folded by moving the connected portions of the sections 11 upwardly. This arrangement is advantageous since any weight carried by the bed tends to move the abutting faces of the sections into positive engagement and to hold these sections rigid and extended.

I claim:

1. In a bed, a frame including side rails, each side rail including a pair of sections, a pair of links for the sections of each side rail, each pair of links being pivotally connected at one end to one section of a side rail and being pivotally connected intermediate its ends to the other section of the same side rail, a transverse pin carried by the links, said other section having an inclined slot receiving said pin in the extended postion of the sections, said sections having abutting faces beveled on a plane inclined with respect to the vertical and extending transverse to the longitudinal axis of the side rail.

2. In a bed, a frame including side rails made up of pivoted sections, a longitudinally elastic spring, end rails carrying the spring, legs, means for pivotally connecting the legs and side rails including brackets having portions constituting stops engageable with said legs, said brackets also having arms secured to the side rails, and means for detachably connecting the end rails to the side rails including clips carried by the end rails and adapted to embrace the arms of the brackets, the sections of the side rails constituting a stretching device for the spring in setting up the bed and the spring when tensioned serving to hold the clips in engagement with said arms.

RAY SQUIER MATTINGLEY.